United States Patent
Miyoshi et al.

(10) Patent No.: US 6,281,840 B1
(45) Date of Patent: Aug. 28, 2001

(54) RADIO COMMUNICATION APPARATUS AND TRANSMISSION ANTENNA CHANGING METHOD

(75) Inventors: Kenichi Miyoshi; Takayuki Suzuki, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/426,199

(22) Filed: Oct. 25, 1999

(30) Foreign Application Priority Data

Oct. 29, 1998 (JP) .................................. 10-308915

(51) Int. Cl.$^7$ ...................................... H04B 7/06
(52) U.S. Cl. .................. 342/374; 342/373; 455/103; 455/562; 455/277.1
(58) Field of Search ..................... 342/374, 368, 342/373; 455/101, 103, 562, 277.1, 277.2; 375/299

(56) References Cited

U.S. PATENT DOCUMENTS 5,701,596 * 12/1997 Meredith et al. ............... 455/103

FOREIGN PATENT DOCUMENTS

2323750 A * 9/1998 (GB) .......................... H04B/7/04
10209932 8/1998 (JP) .

OTHER PUBLICATIONS

English language abstract of JP 10–209932.

* cited by examiner

Primary Examiner—Thomas H. Tarcza
Assistant Examiner—Fred H Mull
(74) Attorney, Agent, or Firm—Greenblum & Bernstein, P.L.C.

(57) ABSTRACT

Received signal strength detecting means 109 and 110 detect received signal strength of the antennas of the respective terminals. A transmission antenna selector 111 selects an antenna with a maximum received signal strength with respect to the respective communication destinations, and when there is a plurality of communication destinations having the same antenna with a maximum received signal strength, the transmission antenna selector selects transmission antennas to be different from each other based on the received signal strength of the antennas with the second largest received signal strength, and an internal switch of a transmission antenna change device 114 is changed based on the selection result. This eliminates the need for providing mixers without reducing transmission diversity effect, and results in a reduction of a maximum output of a transmission amplifier.

17 Claims, 11 Drawing Sheets

FIG.1

PRIOR ART

|  | ANTENNA NUMBER | RECEIVED SIGNAL STRENGTH | TRANSMISSION ANTENNA |
|---|---|---|---|
| TERMINAL A | 1 | 47dB | O |
|  | 2 | 40dB |  |
|  | 3 | 42dB |  |
|  | 4 | 37dB |  |
| TERMINAL B | 1 | 50dB | O |
|  | 2 | 45dB |  |
|  | 3 | 38dB |  |
|  | 4 | 41dB |  |

| | ANTENNA NUMBER | RECEIVED SIGNAL STRENGTH | TRANSMISSION ANTENNA |
|---|---|---|---|
| TERMINAL A | 101 | 47dB | O |
| | 102 | 40dB | |
| | 103 | 42dB | |
| | 104 | 37dB | |
| TERMINAL B | 101 | 50dB | |
| | 102 | 45dB | O |
| | 103 | 38dB | |
| | 104 | 41dB | |

|  | ANTENNA NUMBER | RECEIVED SIGNAL STRENGTH | TRANSMISSION ANTENNA |
|---|---|---|---|
| TERMINAL A | 101 | 37 |  |
|  | 102 | 40 |  |
|  | 103 | 42 |  |
|  | 104 | 47 | ○ |
| TERMINAL B | 101 | 38 |  |
|  | 102 | 41 |  |
|  | 103 | 45 | ○ |
|  | 104 | 50 |  |
| CONTROL CHANNEL | 101 | — |  |
|  | 102 | — | ○ |
|  | 103 | — |  |
|  | 104 | — |  |

RADIO COMMUNICATION APPARATUS AND TRANSMISSION ANTENNA CHANGING METHOD

BACKGROUND OF THE INVENTION

1. Field of the Invention

The present invention relates to a radio communication apparatus for performing transmission using selective diversity and a transmission antenna changing method.

2. Description of the Related Art

In a radio communication system, there has recently been used space diversity having a plurality of antenna branches (hereinafter referred to as simply "antenna") in a base station, for securing a plurality of paths in order to improve the quality of reception. As one space diversity, there is a selective diversity that selects an optimum antenna in accordance with a propagation state.

In the case of using the selective diversity on the transmit side, in a reverse link, the received signal strength of each terminal is obtained for each antenna and an antenna with a large received signal strength is selected, and signals are transmitted from the selected antenna.

Figure 1:
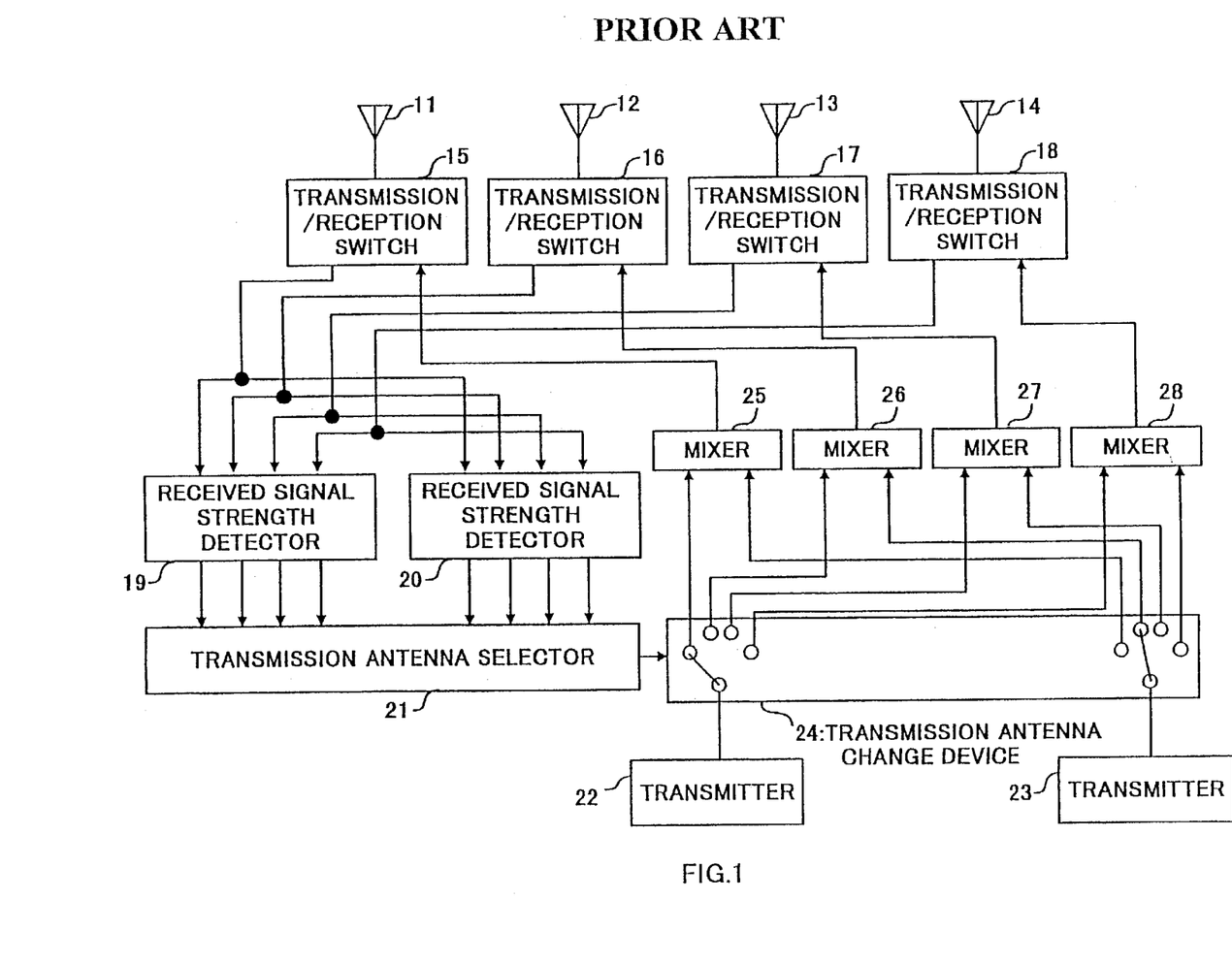
FIG. 1 is a block diagram showing the configuration of the conventional base station.

Hereinafter, a description is given of the flow of signals in a conventional radio communication apparatus using a base station as an example of a radio communication apparatus. FIG. 1 is a block diagram showing the configuration of the conventional base station.

First of all, signals radio transmitted from the respective terminals are received by antennas 11 to 14 at the reception timing, and the received signals are input to received signal strength detecting means 19 and 20 through transmission/reception switches 15 to 18.

Then, received signal strength of each antenna of each terminal is detected by detecting means 19 and 20, and each detected received signal strength is associated with each antenna number, and the result is stored temporarily.

After that, a transmission antenna selector 21 selects an antenna with a maximum received signal strength for each terminal and outputs a corresponding control signal to a transmission antenna change device 24, so that an internal switch of transmission antenna change device 24 is changed on the basis of the control signal.

Then, at the transmission timing, transmitting signals with respect to each terminal are output from transmitters 22 and 23, and input to any one of mixers 25 to 28 through transmission antenna change device 24.

Thereafter, signals input to the respective mixers 25 to 28 are multiplexed, and radio transmitted from any one of antennas 11 to 14.

Figure 2:
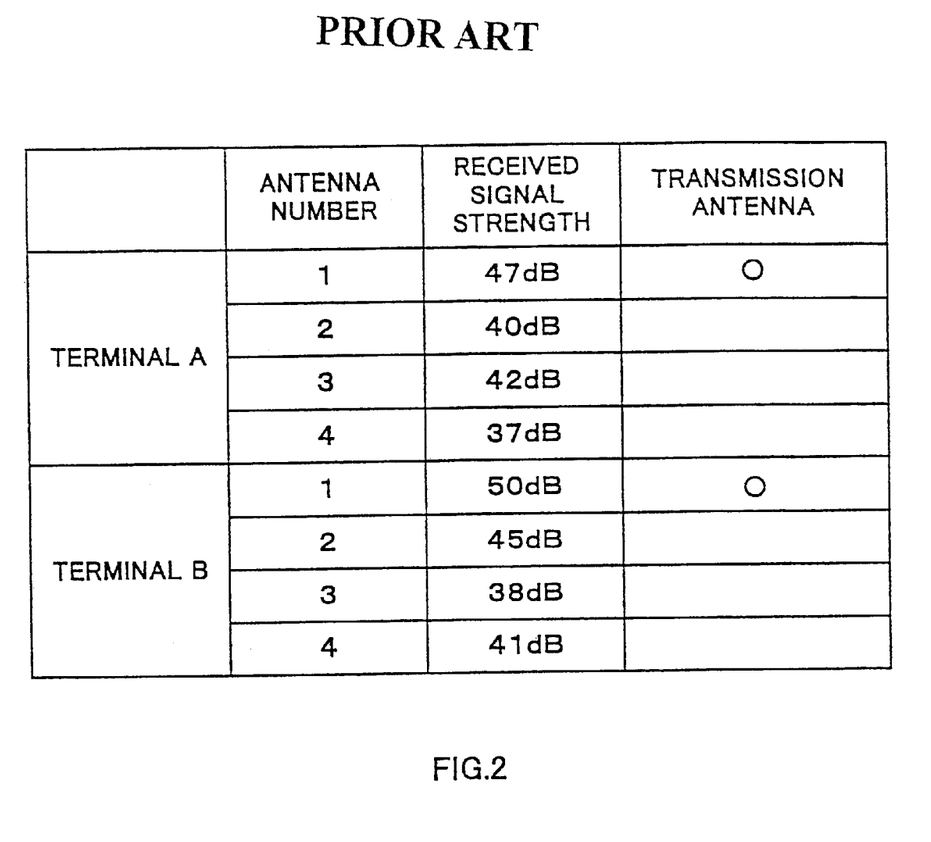
FIG. 2 is a view showing a result of transmission antenna select processing in the conventional base station.

FIG. 2 is a view showing a result of transmission antenna select processing, which is carried out by the transmission antenna selector 21 of the conventional base station.

In FIG. 2, regarding the received signal strength of antennas of terminal A, antennas 11 to 14 have 47 dB, 40 dB, 42 dB, 37 dB, respectively. Also, regarding the received signal strength of antennas of terminal B, antennas 11 to 14 have 50 dB, 45 dB, 38 dB, 41 dB, respectively.

In the case of FIG. 2, the antenna with a maximum received signal strength of terminal A is antenna 11, and the antenna with a maximum received signal strength of terminal B is antenna 11. Therefore, transmission antenna selector 21 selects antenna 11 as a transmission antenna for terminal A, and selects antenna 11 as a transmission antenna for terminal B.

Thus, in the aforementioned conventional radio communication apparatus and the transmission antenna changing method, an antenna whose received signal strength becomes maximum at the reception timing of pre-transmission is selected as a transmission antenna.

However, in the aforementioned conventional radio communication apparatus, mixers are required since there is possibility that transmitting signals will be transmitted to a plurality of terminals from the same antenna, and if n (n=two or more natural number) transmitters are used, n mixers are needed. For this reason, the more the number of transmitters to be used is increased, the greater a loss (about 3 dB×n) occurred in the mixers becomes, so that unnecessary heat is generated.

Also, the loss occurred in the mixers corresponds to about a half of energy generated by a transmission amplifier provided in the transmitter, and this causes a problem in which a large-sized transmission amplifier must be used in consideration of such a loss.

SUMMARY OF THE INVENTION

A first object of the present invention is to provide a radio communication apparatus, which reduces a maximum output of a transmission amplifier with no need of mixers without deteriorating quality of transmitting signals and a transmission antenna changing method.

According to the present invention, when transmission antennas, each having a maximum received signal strength, are selected as transmission antennas with respect to the respective communication destinations and there exists a plurality of communication destinations having the same antenna with a maximum received signal strength, transmission antennas are selected not be to overlapped with other based on the second largest received signal strength of antennas, so that the aforementioned object can be attained.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Hereinafter, embodiments of the present invention will be specifically explained using a base station as an example of a radio communication apparatus with reference to drawings accompanying herewith.

(First embodiment)

Figure 3:
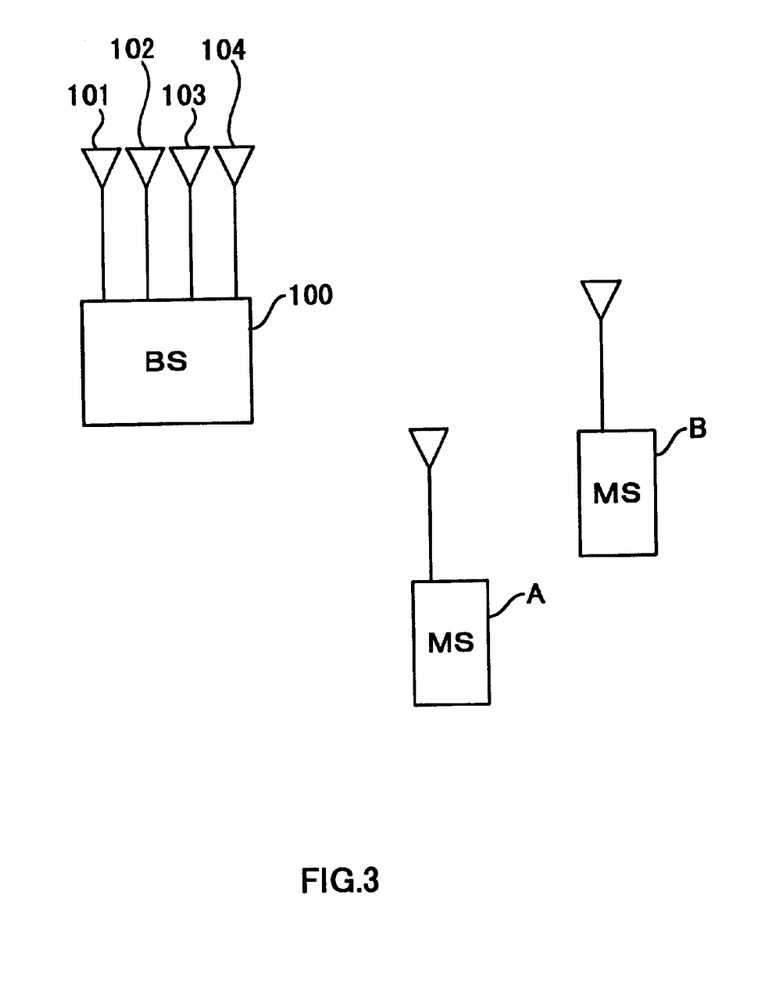
FIG. 3 is a system configuration view showing a radio communication system including a base station of the present invention.

FIG. 3 is a system configuration view showing a radio communication system including the base station of the present invention. A base station 100 performs radio communications between terminals A and B simultaneously, and receives signals of a reverse link transmitted from terminals A and B, and transmits signals of a forward link to the respective terminals A and B from one antenna selected among antennas 101 to 104.

Figure 4:
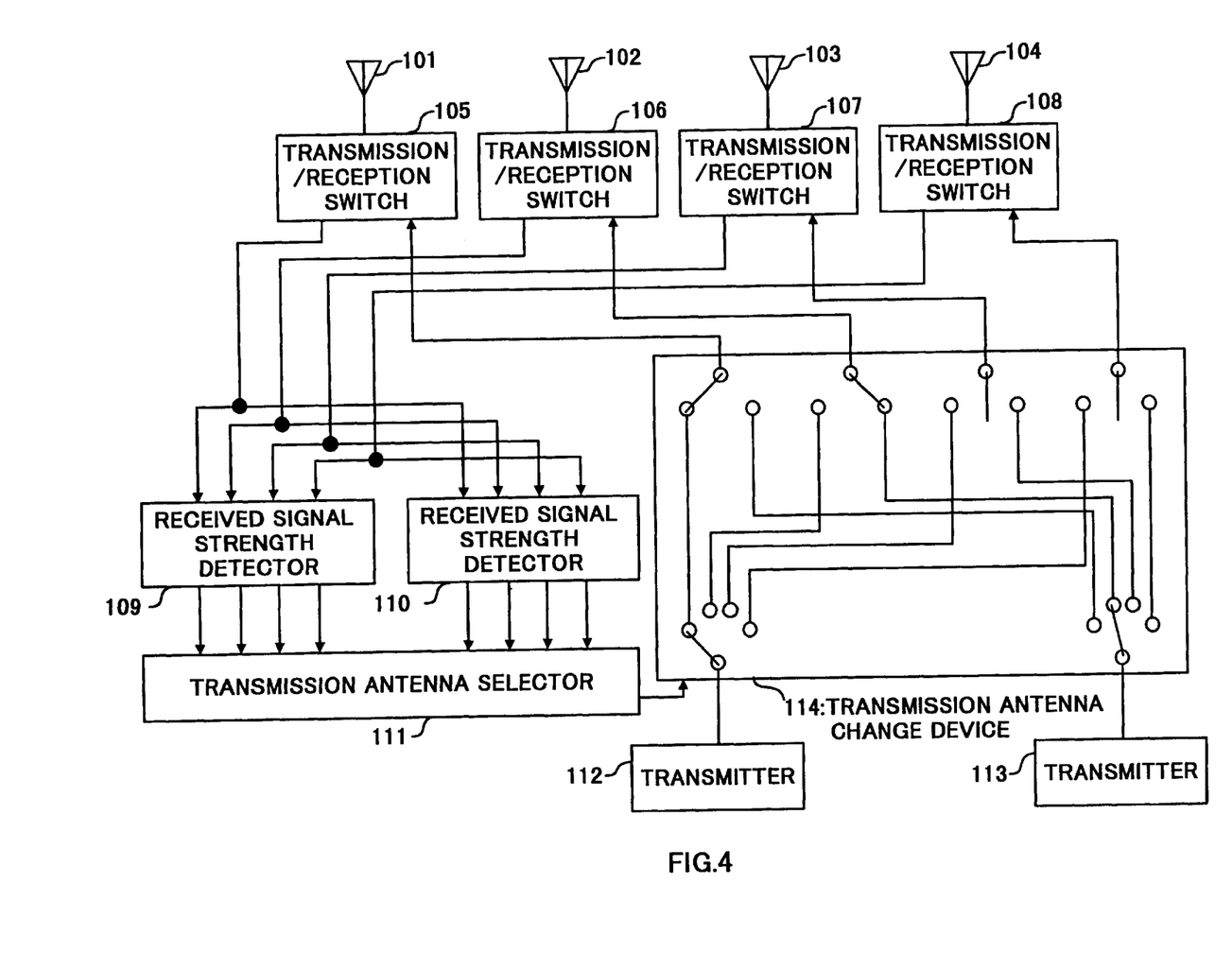
FIG. 4 is a block diagram showing the configuration of the base station according to a first embodiment of the present invention.

FIG. 4 is a block diagram showing the configuration of the base station according to the first embodiment of the present invention.

In FIG. 4, transmission/reception switches 105 to 108, which are provided to use the same antenna at the receiving and transmitting time, output signals radio received by antennas 101 to 104 sheared between reception and transmission to received signal strength detectors 109 and 110. Then, transmission/reception switches 105 to 108 output transmitting signals sent from a transmission antenna change device 114 to antennas 101 to 104, respectively.

The received signal strength detectors 109 and 110 detect received signal strength of signals received by antennas 101 to 104 and antenna numbers and their received signal strength are temporarily stored.

The transmission antenna selector 111 selects antennas for transmitting signals to the respective terminals to be different from each other based on the received signal strength detected by the detectors 109 and 110. Then, the transmission antenna selector 111 outputs a control signal based on the selection result, and controls the transmission antenna change device 114.

Transmitters 112 and 113 use individual carriers, respectively, and output transmitting signals with respect to different terminals to the transmission antenna change device 114. The transmission antenna change device 114 changes an internal switch based on the control signal output from the transmission antenna selector 111, and outputs the transmitting signals output from transmitters 112 and 113 to any one of transmission/reception switches 105 to 108.

Next, a description is given of the flow of signals of the base station according to the first embodiment of the present invention.

First of all, signals radio transmitted from the respective terminals are received by antennas 101 to 104 at the reception timing. The received signals are input to received signal strength detectors 109 and 110 through transmission/reception switches 105 to 108.

Then, received signal strength of each antenna of each terminal is detected by detector 109 and 110, and each detected received signal strength is associated with each antenna number, and the result is stored temporarily.

After that, a transmission antenna selector 111 selects transmission antennas from which transmitting signals with respect to the respective terminals are transmitted not be to overlapped with other based on the antenna numbers and received signal strength by transmission antenna select processing to be describe later. Then, a corresponding control signal is output to the transmission antenna change device 114, and the internal switch of the transmission antenna change device 114 is changed on the basis of the control signal.

Then, at the transmission timing, transmitting signals with respect to each terminal are output from transmitters 112 and 113, and radio transmitted from any one of antennas 101 to 104 through transmission antenna change device 114 and transmission/reception switches 105 to 108.

Figure 5:
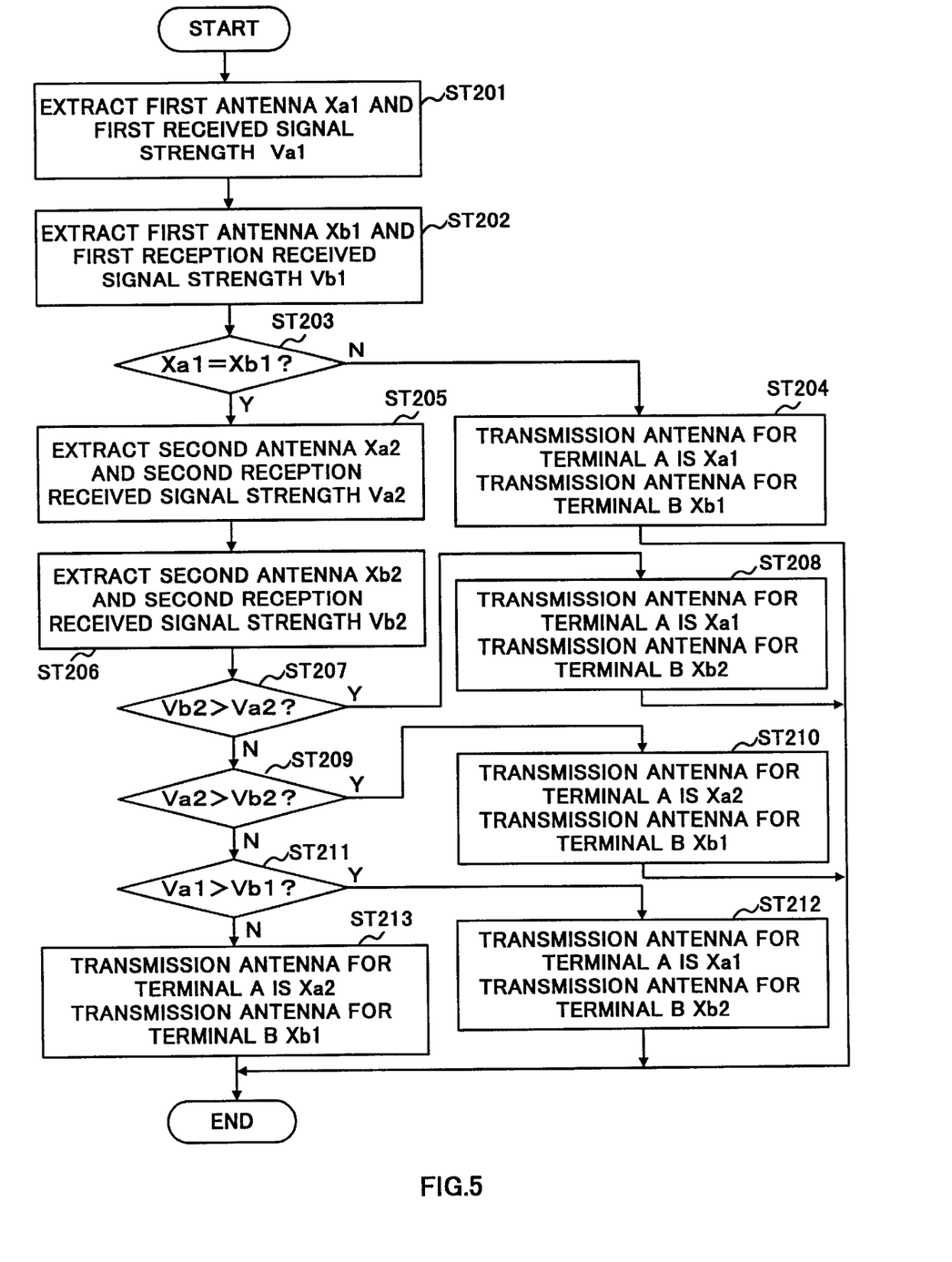
FIG. 5 is a flowchart showing a transmission antenna select processing of the base station according to the first embodiment of the present invention.

Next, a description is given of transmission antenna select processing, which is carried out by the transmission antenna selector 111 of the base station according to the first embodiment, with reference to the flowchart of FIG. 5. In this case, it is assumed that the transmitter 112 transmits data to terminal A, and that transmitter 113 transmits data to terminal B. Also, it is assumed that received signal strength detectors 109 detects the received signal strength from terminal A for each antenna, and that received signal strength detectors 110 detects the received signal strength from terminal B for each antenna.

First of all, in step (hereinafter referred to as "ST") 201, antenna (hereinafter referred to as "first antenna") Xa1 of terminal A having a maximum received signal strength and the received signal strength (hereinafter referred to as "first received signal strength") Va1 are extracted from the output of received signal strength detector 109. Similarly, in ST202, first antenna Xb1 of terminal B and first received signal strength Vb1 are extracted from the output of received signal strength detector 110.

Next, in ST203, it is determined whether or not first antenna Xa1 of terminal A is the same as first antenna Xb1 of terminal B. Then, when first antenna Xa1 of terminal A and first antenna Xb1 of terminal B are different from each other, antenna Xa1 is selected as a transmission antenna (hereinafter referred to "transmission antenna for terminal A") of signals to be transmitted to terminal A from transmitter 112. Also, antenna Xb1 is selected as a transmission antenna (hereinafter referred to "transmission antenna for terminal B") of signals to be transmitted to terminal B from transmitter 113 in ST204.

As a result of the determination of ST203, when first antenna Xa1 of terminal A is the same as first antenna Xb1 of terminal B, antenna Xa2 (hereinafter referred to as "second antenna") having the second largest received signal strength of terminal A and the received signal strength (hereinafter referred to as "second received signal strength) Va2 are extracted in ST205. Also, second antenna Xb2 of terminal B and second received signal strength Vb2 are extracted in ST206.

Next, in ST207, it is determined whether or not second received signal strength Va2 of terminal A is larger than second received signal strength Vb2 of terminal B. Then, when second received signal strength Vb2 of terminal B is larger than second received signal strength Va2 of terminal A, antenna Xa1 is selected as a transmission antenna for terminal A and antenna Xb2 is selected as a transmission antenna for terminal B in ST208.

As a result of the determination of ST207, when second received signal strength Vb2 of terminal B is not larger than second received signal strength Va2 of terminal A, it is determined whether or not second received signal strength Va2 of terminal A is larger than second received signal strength Vb2 of terminal B in ST209. Then, when second received signal strength Va2 of terminal A is larger than second received signal strength Vb2 of terminal B, antenna Xa2 is selected as a transmission antenna for terminal A and antenna Xb1 is selected as a transmission antenna for terminal B in ST210.

As a result of the determination of ST209, when second received signal strength Va2 of terminal A is not larger than second received signal strength Vb2 of terminal B, namely, second received signal strength Va2 of terminal A is equal to second received signal strength Vb2 of terminal B, it is determined whether or not first received signal strength Va1 of terminal A is larger than first received signal strength Vb1 of terminal B in ST211. Then, when first received signal strength Va1 of terminal A is larger than first received signal strength Vb1 of terminal B, antenna Xa1 is selected as; a transmission antenna for terminal A and antenna Xb2 is selected as a transmission antenna for terminal B in ST212.

As a result of the determination of ST211, when first received signal strength Va1 of terminal A is not larger than first received signal strength Vb1 of terminal B, antenna Xa2 is selected as a transmission antenna for terminal A and antenna Xb1 is selected as a transmission antenna for terminal B in ST213.

Figure 6:
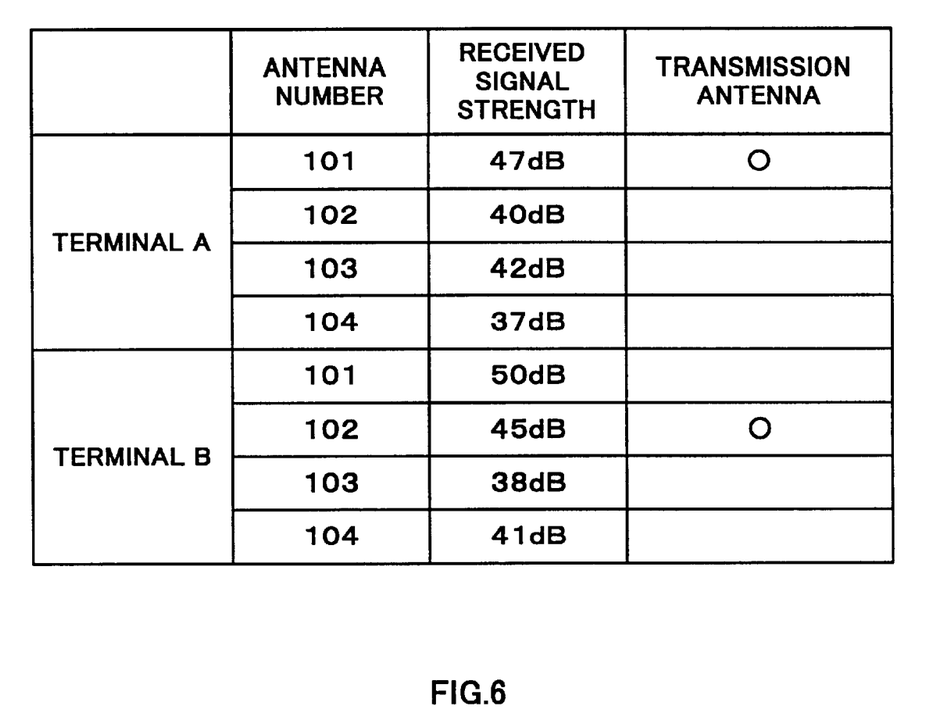
FIG. 6 is a view showing a result of transmission antenna select processing of the base station according to the first embodiment of the present invention.

FIG. 6 is a view showing a result of transmission antenna select processing conducted by transmission antenna selector 111 of the base station according to the first embodiment.

In FIG. 6, regarding the received signal strength of antennas of terminal A, antennas 101 to 104 have 47 dB, 40 dB, 42 dB, 37 dB, respectively. Also, regarding the received signal strength of antennas of terminal B, antennas 101 to 104 have 50 dB, 45 dB, 38 dB, 41 dB, respectively.

In the case of FIG. 6, both the first antenna of terminal A and that of terminal B are antennas 101. Therefore, the transmission antenna selector 111 compares the received signal strength of the second antenna of terminal A with that of the terminal B.

Since the received signal strength (45 dB) of the second antenna 102 of terminal B is larger than the received signal strength (42 dB) of the second antenna 103 of terminal A, the transmission antenna selector 111 selects antenna 101 as a transmission antenna for terminal A, and antenna 102 as a transmission antenna for terminal B.

The antennas can be thus allocated to be different from each other as the transmission antenna for each terminal. As a result, the need for providing the mixers can be eliminated, and the transmission amplifier can be downsized.

Also, when the antenna with the maximum received signal strength is the same in two terminals, the second largest received signal strength of the antenna of one terminal is compared with that of the other terminal. Then, the antenna with a larger received signal strength is selected as a transmission antenna for the corresponding terminal, and the antenna having the maximum received signal strength is selected as a transmission antenna for the other terminal. This makes it possible to maximize an average value of the received signal strength.

Accordingly, it is possible to reduce deterioration of diversity effect, which is caused when the antenna with the maximum received signal strength cannot be selected as a transmission antenna, so that effective transmission diversity can be carried out.

(Second embodiment)

In the conventional base station, a predetermined one transmission antenna for a control channel was fixed unlike a communication channel, which carried out selective diversity based on the received signal strength.

However, control channel signals are transmitted to the plurality of terminals, which perform communications with the self-station, and it is unnecessary to perform transmission diversity with respect to a specific destination station.

Therefore, according to the second embodiment, the transmission antenna for control channel is varied and the transmission antenna for communication channel is selected. Thereafter, the transmission antenna for communication channel is selected from the residual antennas, so that the performance of transmission diversity can be effectively realized.

Figure 7:
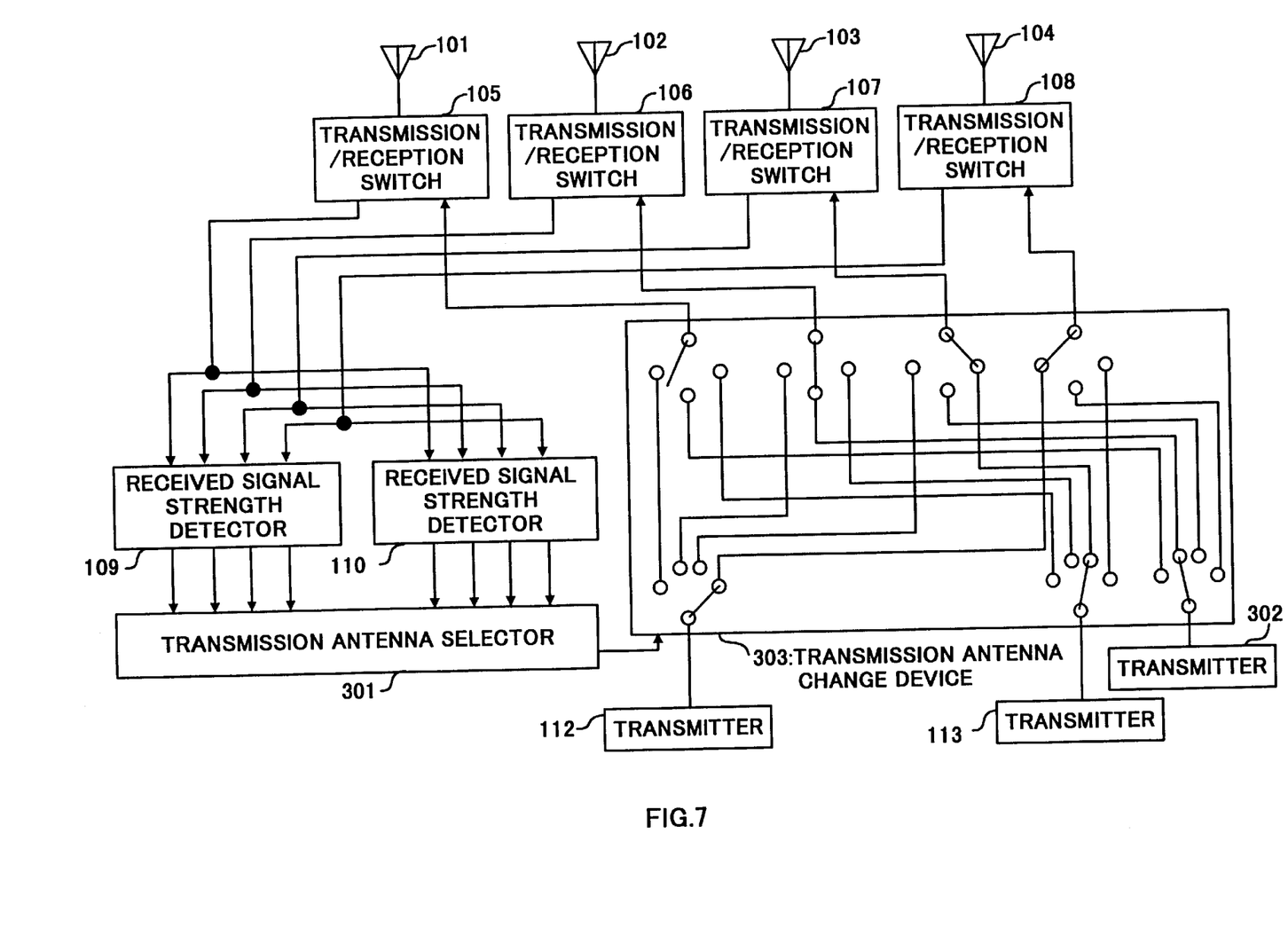
FIG. 7 is a block diagram showing the configuration of the base station according to a second embodiment of the present invention.

FIG. 7 is a block diagram showing the configuration of the base station according to the second embodiment. In the base station of FIG. 7, the same reference numerals as those of FIG. 4 are added to the configuration portions common to the base station of FIG. 4, and the explanation will be omitted.

A transmission antenna selector 301 selects antennas for transmitting signals to the respective terminals to be different from each other by the process shown in FIG. 4 based on the received signal strength detected by the detectors 109 and 110. Then, transmission antenna selector 301 selects an antenna for transmitting signals for control channel from the residual antennas. After that, transmission antenna selector 301 outputs a control signal based on the result of the select processing, and controls a transmission antenna change device 302.

The transmission antenna change device 302 changes an internal switch based on the control signal output from the transmission antenna selector 111, and outputs transmitting signals sent from transmitters 112, 113, and 303 to any one of transmission/reception switches 105 to 108.

Figure 8:
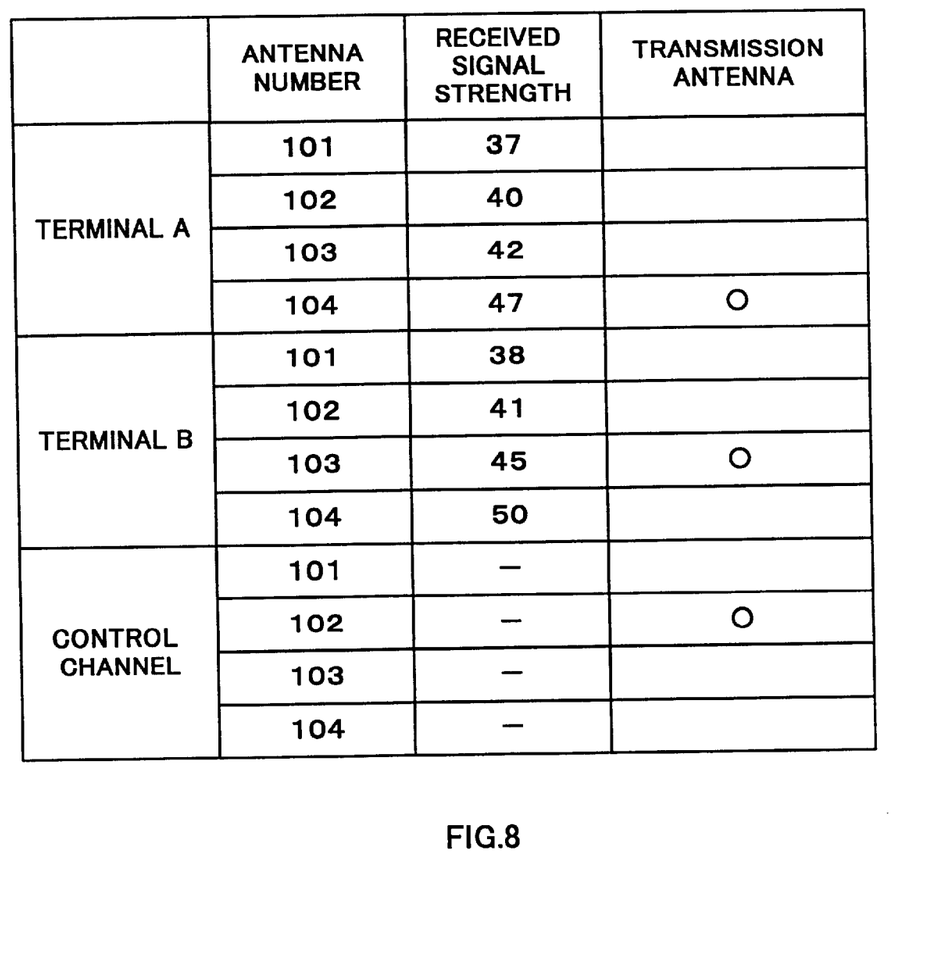
FIG. 8 is a view showing a result of transmission antenna select processing of the base station according to the second embodiment of the present invention.

FIG. 8 is a view showing a result of transmission antenna select processing, which is carried out by the transmission antenna selector 301 of the base station according to the second embodiment.

In FIG. 8, regarding the received signal strength of antennas of terminal A, antennas 101 to 104 have 37 dB, 40 dB, 42 dB, 47 dB, respectively. Also, regarding the received signal strength of antennas of terminal B, antennas 101 to 104 have 38 dB, 41 dB, 45 dB, 50 dB, respectively.

In the case of FIG. 8, both the first antenna of terminal A and that of terminal B are antennas 104. Therefore, the transmission antenna selector 301 compares the received signal strength of the second antenna of terminal A with that of the terminal B.

Since the received signal strength (45 dB) of the second antenna 103 of terminal B is larger than the received signal strength (42 dB) of the second antenna 103 of terminal A, the transmission antenna selector 301 selects antenna 104 as a transmission antenna for terminal A and antenna 103 as a transmission antenna for terminal B.

Then, the antenna selector 301 selects either residual antenna 101 or 102 as a transmission antenna for control channel.

Thus, after the transmission antenna is allocated to each terminal, the transmission antenna for control channel is selected from the residual antennas, so that the different antennas can be allocated as the transmission antenna including one for control channel. As a result, the need for providing the mixers can be eliminated, the transmission amplifier can be downsized, and effective transmission diversity can be carried out.

(Third embodiment)

The third embodiment is a form in which a channel allocation is performed when communications is carried out at the same time using a plurality of frequency channels.

Figure 9:
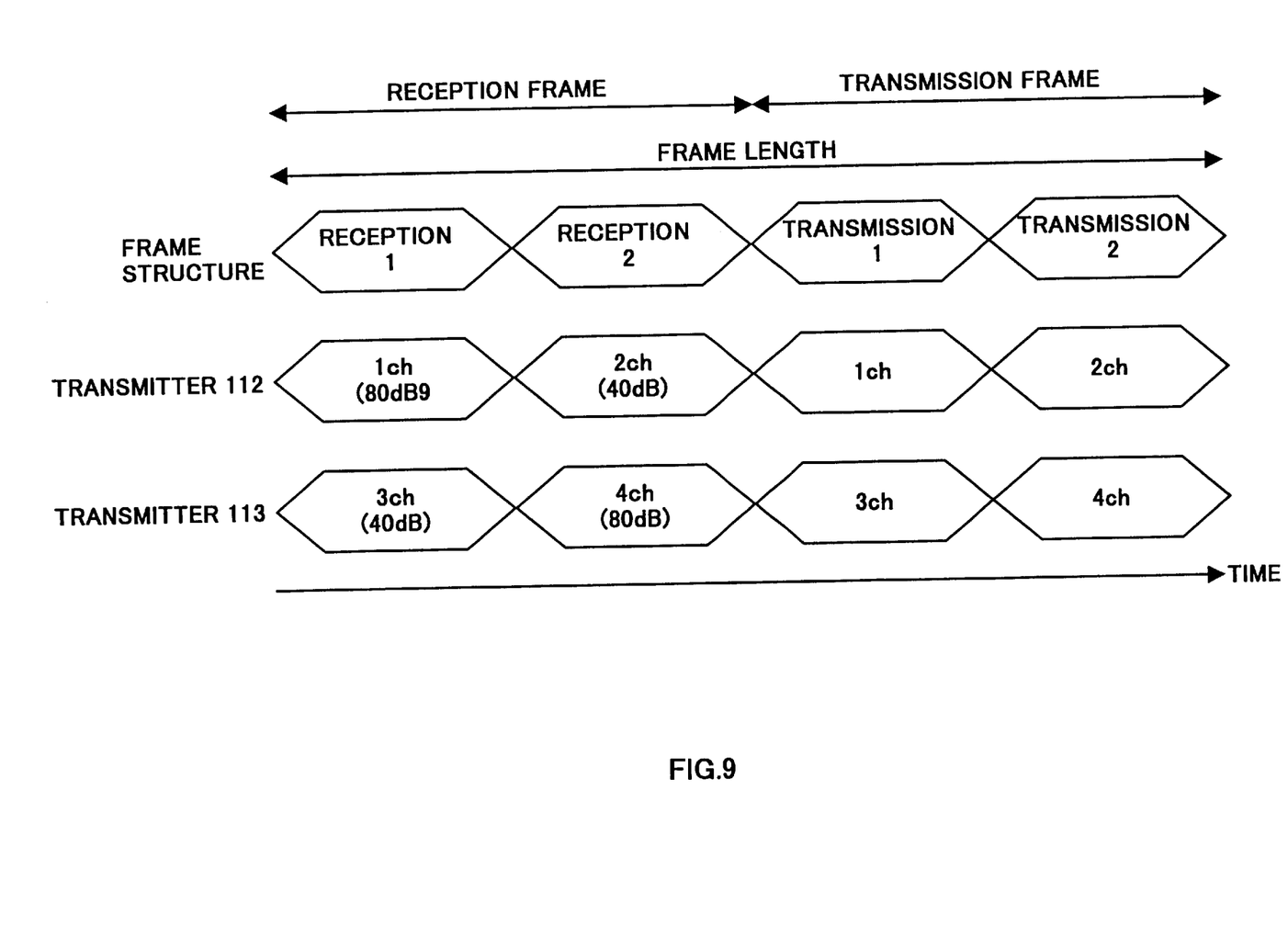
FIG. 9 is a view explaining a channel allocation according to a third embodiment of the present invention.
Figure 10:
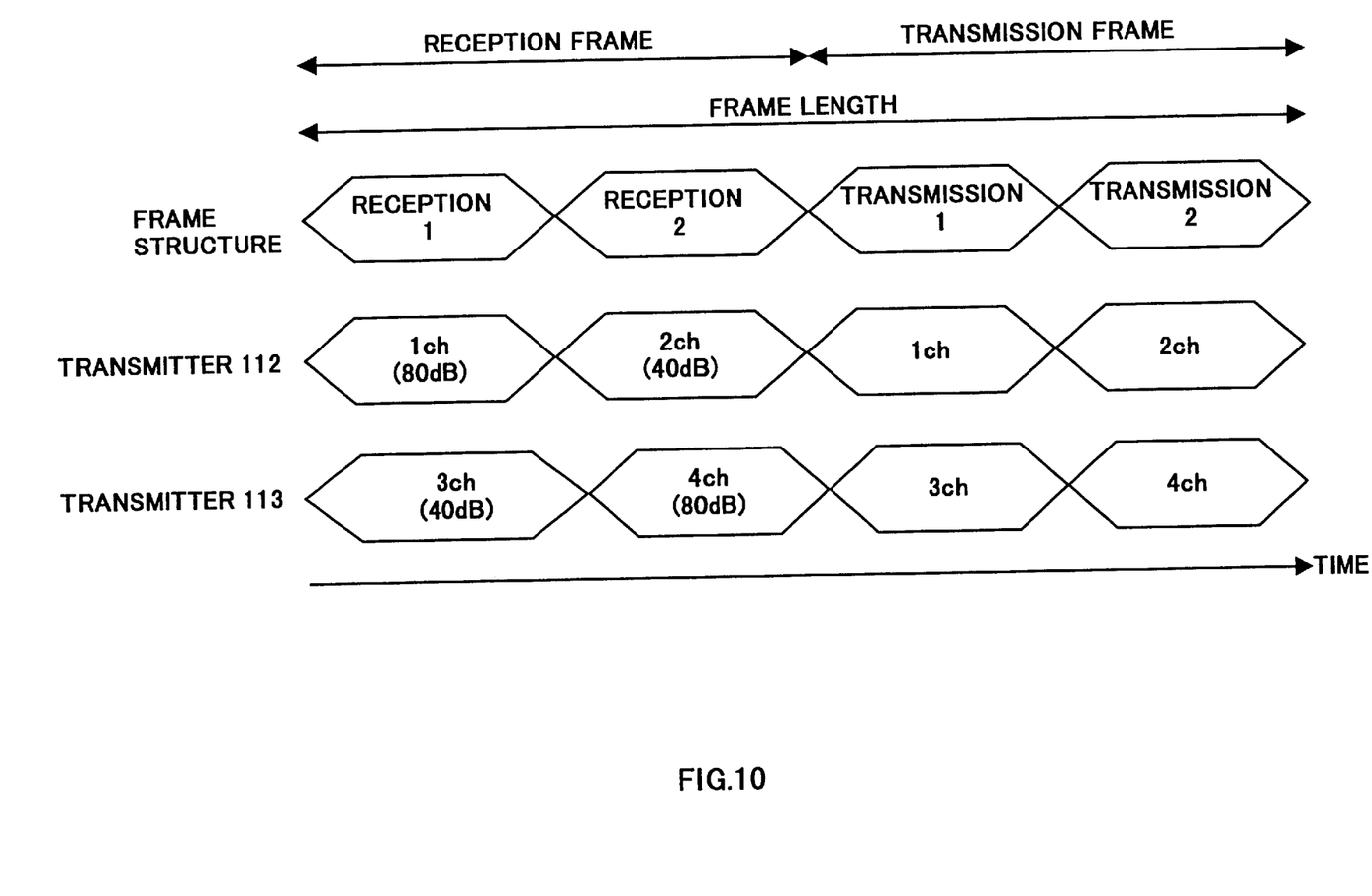
FIG. 10 is a view explaining a channel allocation according to the third embodiment of the present invention.

FIGS. 9 and 10 are views each explaining a channel allocation according to the third embodiment.

In FIGS. 9 and 10, TDMA-TDD system is used as a signal division system, and four channels including channel 1 to channel 4 exist in one frame. Then, transmitter 112 performs transmission using channels 1 and 2, and transmitter 113 performs transmission using channels 3 and 4 having frequencies different from those of channels 1 and 2. Also, transmission using channels 1 and 3 is carried out at the same time, and transmission using channels 2 and 4 is carried out at the same time.

It is assumed that transmitter 112 performs transmission to terminal A with about 80 dB of an average value of received signal strength by use of channel 1, and that transmission to terminal C with about 40 dB of an average value of received signal strength by use of channel 2. Then, it is assumed that a communication request with about 80 dB of the average value of received signal strength is sent from terminal B and that a communication request with about 40 dB of an average value of received signal strength is set from terminal D.

FIG. 9 shows a case in which channel 3 is allocated to terminal B and channel 4 is allocated to terminal D. FIG. 10 shows a case in which channel 3 is allocated to terminal D and channel 4 is allocated to terminal B.

When the channel allocation is made as shown in FIG. 9, the difference in the average value of received signal strength is decreased (about 0 dB). Also, When the channel allocation is made as shown in FIG. 10, the difference in the average value of received signal strength is increased (about 40 dB).

Figure 11:
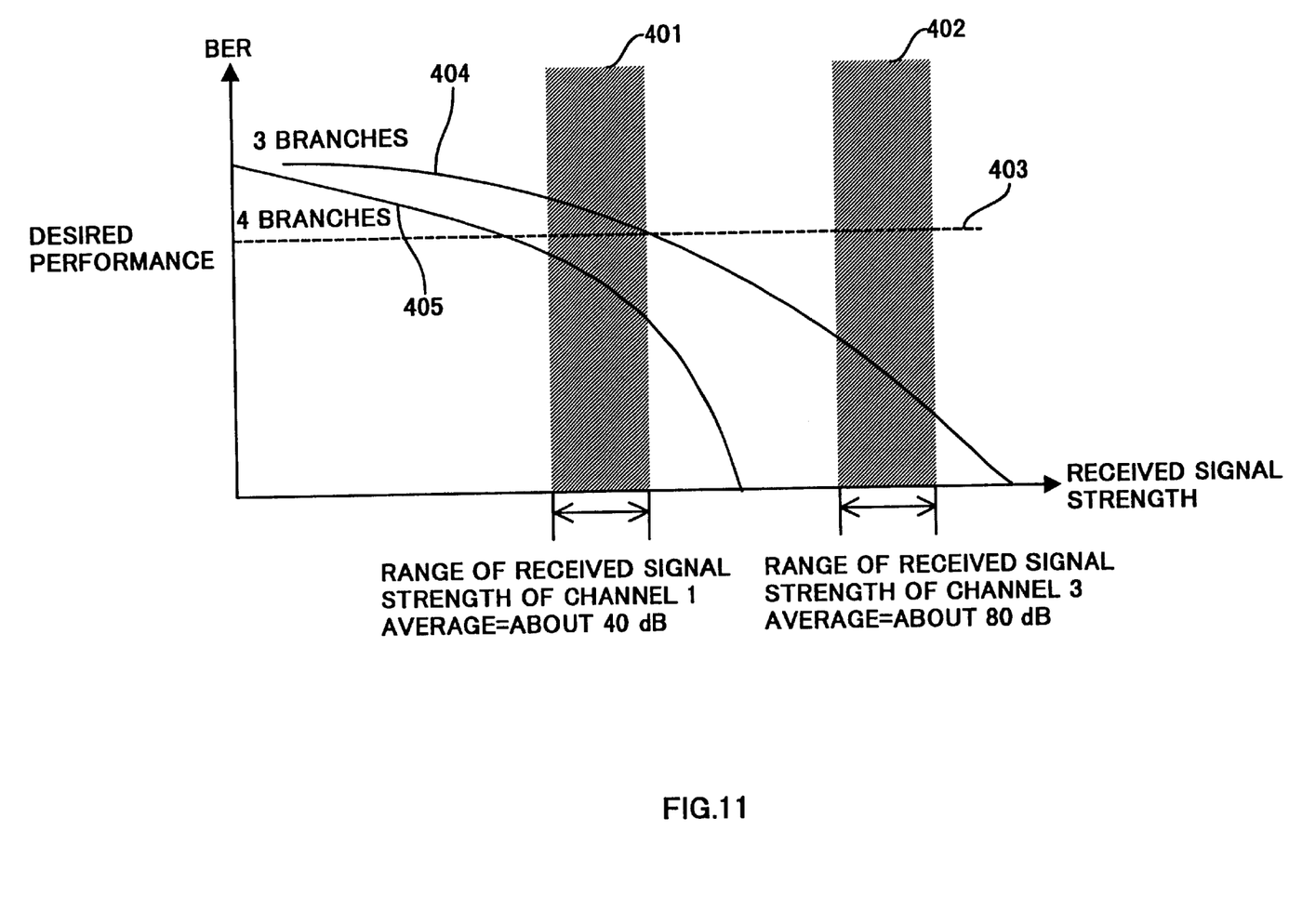
FIG. 11 is a view showing the relationship between received signal strength and BER the third embodiment of the present invention.

FIG. 11 is a view showing the relationship between received signal strength and BER (Bit Error Rate) when the channel allocation is made as shown in FIG. 10.

In FIG. 11, a shaded area 401 denotes the range of received signal strength of channel 1, and a shaded area 402 denotes the range of received signal strength of channel 3. Also, a dotted line 403 denotes a boundary whether or not a desired performance of transmission diversity is satisfied. A solid line 404 denotes a BER characteristic curve when three branch diversity transmission in which one antenna is selected from three antennas is performed. A solid line 405 denotes a BER characteristic curve when four branch diversity transmission in which one antenna is selected from four antennas is performed.

As is obvious from FIG. 11, solid line 405 falls below dotted line 403 but solid line 4104 does not fall below solid line 403 in the range of received signal strength of channel 1, which is about 40 dB of the average value of received signal strength. Namely, it is apparent that the desired performance can be satisfied when four branch diversity transmission is performed but it cannot be satisfied when three branch diversity transmission is performed.

Also, both solid lines 405 and 404 fall below dotted line 403 in the range of received signal strength of channel 3, which is about 80 dB of the average value of received signal strength. Then, it is apparent that the desired performance can be satisfied when four branch diversity transmission or three branch diversity transmission is performed.

Here, as shown in FIG. 10, the channel allocation is performed to increase the difference in the average value of received signal strength and transmission antenna select processing as explained in the first or second embodiment is performed. In this case, even if the first antennas having the maximum received signal strength are the same, second received signal strength of the channel with a low average value of received signal strength is made smaller than second received signal strength of the channel having a high average value of received signal strength.

Namely, the antenna selection is always performed with respect to the channel having a low average value of received signal strength by priority over all. As a result, four branch diversity transmission operation is performed with respect to the channel having a low average value of received signal strength, and four branch diversity transmission operation or three branch diversity transmission operation is performed with respect to the channel having a high average value of received signal strength. This satisfies the desired performance without fail.

While, as shown in FIG. 9, when the channel allocation is performed to decrease the difference in the average value of received signal strength, both average values of received signal strength of channels 2 and 4 by which communications is carried out at the same time become 40 dB. As a result, four branch diversity transmission cannot be performed by use of each channel. This causes a problem in which the desired performance cannot be satisfied and the quality of transmission is deteriorated.

Thus, in a case where communications is carried out at the same time by use of a plurality of channels, each channel is allocated to increase the difference in the average value of received signal strength. This makes it possible to realize transmission diversity, which satisfies the desired performance.

The above embodiments explained the case in which two transmitters for communication channel and four antennas were used in the base station. However, in the present invention, no limitation is added to the number of transmitters and that of antennas. Even if the number of transmitters and that of antennas are increased or decreased, the same effect can be obtained.

Moreover, the above embodiments were explained using the base station as an example of a radio communication apparatus. However, the present invention is not limited to the base station, and the same effect can be obtained in the other radio communication apparatuses.

As explained above, according to the radio communication apparatus of the present invention and the transmission antenna changing method, the different antenna can be allocated as the transmission antenna for each terminal. As a result, the need for providing the mixers can be eliminated, and a maximum output of a transmission amplifier can be reduced without deteriorating quality of transmitting signals.

The present invention is not limited to the above described embodiments, and various variations and modifications may be possible without departing from the scope of the present invention.

This application is based on the Japanese Patent Application No. HEI 10-308915 filed on Oct. 29, 1998, entire content of which is expressly incorporated by reference herein.

What is claimed is:

1. A radio communication apparatus comprising:
   a received signal strength detector configured to detect received signal strength of signals received by a plurality of antennas at the same time for each communication destination and for each antenna;
   a transmission antenna selector configured to select antennas different from each other with respect to the respective communication destinations as transmission antennas based on said detected received signal strength; and
   a transmission antenna changer configured to change said transmission antenna in accordance with a selection result by said transmission antenna selector.

2. The apparatus according to claim 1, wherein said transmission antenna selector selects an antenna with a maximum received signal strength with respect to only one communication destination as a transmission antenna to said corresponding communication destination, and when there is a plurality of communication destinations having the same antenna with a maximum received signal strength, said transmission antenna selector compares the second largest received signal strength of antennas of the respective communication destinations, and selects a transmission antenna with respect to each communication destination based on the comparison result.

3. The apparatus according to claim 2, wherein in the plurality of communication destinations having the same antenna with a maximum received signal strength, said transmission antenna selector allocates said antenna with the maximum received signal strength to the communication destination having an antenna with a minimum value of the second largest received signal strength as a transmission antenna.

4. The apparatus according to claim 3, wherein when there are antennas having a maximum received signal strength with respect to two communication destinations, said transmission antenna selector allocates an antenna having a higher value of the second largest received signal strength of said two communication destinations to said corresponding communication destination as a transmission antenna, and allocates said antenna with the maximum received signal strength to the other communication destination as a transmission antenna.

5. The apparatus according to claim 4, wherein when the second largest received signal strength of antennas in two communication destinations are equal to each other, said transmission antenna selector compares the received signal strength of antennas with a maximum received signal strength in said communication destinations, and selects an antenna with a higher value of the received signal strength to said corresponding communication destination as a transmission antenna and selects the antenna with the second largest received signal strength to the other communication destination as a transmission antenna.

6. The apparatus according to claim 1, wherein said transmission antenna selector selects a transmission antenna for a communication channel and selects an antenna for a control channel from the residual antennas.

7. The apparatus according to claim 1, wherein when communications is performed using a plurality of frequencies at the same time, a channel, in which a difference in an average value of received signal strength between channels is increased in a plurality of vacant channel, is allocated to a destination station from which a communication request is sent.

8. A communication terminal apparatus having a radio communication apparatus, said radio communication apparatus comprising:
a received signal strength detector configured to detect received signal strength of signals received by a plurality of antennas at the same time for each communication destination and for each antenna;
a transmission antenna selector configured to select antennas different from each other with respect to the respective communication destinations as transmission antennas based on said detected received signal strength; and
a transmission antenna changer configured to change said transmission antenna in accordance with a selection result by said transmission antenna selector.

9. A base station apparatus having a radio communication apparatus, said radio communication apparatus comprising:
a received signal strength detector configured to detect received signal strength of signals received by a plurality of antennas at the same time for each communication destination and for each antenna;
a transmission antenna selector configured to select antennas different from each other with respect to the respective communication destinations as transmission antennas based on said detected received signal strength; and
a transmission antenna changer configured to change said transmission antenna in accordance with a selection result by said transmission antenna selector.

10. A transmission antenna changing method comprising the steps of:
detecting received signal strength of signals received by a plurality of antennas at the same time for each communication destination and for each antenna;
selecting antennas different from each other with respect to the respective communication destinations as transmission antennas based on said detected received signal strength; and
changing said transmission antenna in accordance with a selection result by said transmission antenna selecting means.

11. The method according to claim 10, wherein an antenna having a maximum received signal strength with respect to only one communication destination is selected as a transmission antenna to said corresponding communication destination, and when there is a plurality of communication destinations having the same antenna with a maximum received signal strength, the second largest received signal strength of antennas of the respective communication destinations are compared, and a transmission antenna with respect to each communication destination is selected based on the comparison result.

12. The method according to claim 11, wherein in the plurality of communication destinations having the same antenna with a maximum received signal strength, said antenna with the maximum received signal strength is allocated to the communication destination having an antenna with a minimum value of the second largest received signal strength as a transmission antenna.

13. The method according to claim 12, wherein when there are antennas having a maximum received signal strength with respect to two communication destinations, an antenna with a higher value of the second largest received signal strength of said two communication destinations is allocated to the corresponding communication destination as a transmission antenna, and said antenna with the maximum received signal strength is allocated to the other communication destination as a transmission antenna.

14. The method according to claim 13, wherein when the second largest received signal strength of antennas in two communication destinations are equal to each other, the received signal strength of antennas having the maximum received signal strength in said communication destinations are compared, and an antenna with a higher value of the received signal strength is allocated to said corresponding communication destination as a transmission antenna and the antenna with the second largest received signal strength is allocated to the other communication destination as a transmission antenna.

15. The method according to claim 10, a transmission antenna for a communication channel is selected and an antenna for a control channel is selected from the residual antennas.

16. A radio communication method for transmitting signals from antennas determined by the transmission antenna changing method described in claim 10, wherein when communications is performed using a plurality of frequencies at the same time, a channel, in which a difference in an average value of received signal strength between channels is increased in a plurality of vacant channel, is allocated to a destination station from which a communication request is sent.

17. A radio communication apparatus comprising:
   a received signal strength detector configured to detect received signal strength of signals received by a plurality of antennas at the same time for each communication destination and for each antenna;
   a transmission antenna selector configured to select transmission antennas to transmit signals to the respective communication destinations based on the detected received signal strength; and
   a transmission antenna changer configured to change said transmission antenna in accordance with a selection result by said transmission antenna selector.

* * * * *